United States Patent
Brown et al.

(10) Patent No.: US 7,417,550 B2
(45) Date of Patent: Aug. 26, 2008

(54) ENVIRONMENTALLY FRIENDLY RADIO FREQUENCY IDENTIFICATION (RFID) LABELS AND METHODS OF USING SUCH LABELS

(75) Inventors: Katherine A. Brown, Lake Elmo, MN (US); Terry S. Nees, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 357 days.

(21) Appl. No.: 11/017,131

(22) Filed: Dec. 20, 2004

(65) Prior Publication Data

US 2006/0145860 A1   Jul. 6, 2006

(51) Int. Cl.
G08B 13/14 (2006.01)
(52) U.S. Cl. .............. 340/572.7; 340/572.1; 340/572.8; 343/873
(58) Field of Classification Search .............. 340/572.7, 340/572.1, 572.4, 572.6, 572.8; 343/873
See application file for complete search history.

(56) References Cited

U.S. PATENT DOCUMENTS

| | | | |
|---|---|---|---|
| 4,388,432 A | 6/1983 | Eskay | |
| 4,431,080 A | 2/1984 | Everhart | |
| 4,482,675 A | 11/1984 | Witt | |
| 4,569,960 A | 2/1986 | Blake | |
| 5,102,733 A | 4/1992 | Zawadski | |
| 5,125,995 A | 6/1992 | D'Haese et al. | |
| 5,380,779 A | 1/1995 | D'Haese | |
| 5,545,291 A | 8/1996 | Smith et al. | |
| 5,920,290 A * | 7/1999 | McDonough et al. | 343/873 |
| 6,147,604 A * | 11/2000 | Wiklof et al. | 340/572.1 |
| 6,163,260 A * | 12/2000 | Conwell et al. | 340/572.8 |
| 6,177,871 B1 | 1/2001 | Rasband | |
| 6,229,444 B1 * | 5/2001 | Endo et al. | 340/572.6 |
| 6,281,795 B1 * | 8/2001 | Smith et al. | 340/572.1 |
| 6,346,884 B1 * | 2/2002 | Uozumi et al. | 340/572.1 |
| 6,399,258 B2 | 6/2002 | O'Brien et al. | |
| 6,540,865 B1 * | 4/2003 | Miekka et al. | 156/249 |

(Continued)

FOREIGN PATENT DOCUMENTS

EP    0 615 285    9/1994

(Continued)

OTHER PUBLICATIONS

Information from Internet entitled, Handling Hazardous Waste Shipboard, http://www.uscg.mil/pacarea/iceops/cpmanual/Sect_6_Cruise_Planning/HasWast.htm, printed Dec. 6, 2004, 18 pages.

(Continued)

*Primary Examiner*—Davetta W. Goins
(74) *Attorney, Agent, or Firm*—John A. Burtis

(57) ABSTRACT

An environmentally friendly radio frequency identification (RFID) label. One embodiment of the invention provides an environmentally friendly radio frequency identification (RFID) label, comprising: a substrate including a first major surface and a second major surface opposite the first major surface; an RFID antenna attached to the first major surface of the substrate, where the RFID antenna is consisting essentially of tin, aluminum, palladium, gold, or combinations thereof; an integrated circuit attached to the antenna; and a first layer of repulpable adhesive attached to the substrate. The present invention also provides methods using environmentally friendly radio frequency identification (RFID) labels.

23 Claims, 1 Drawing Sheet

U.S. PATENT DOCUMENTS

| | | |
|---|---|---|
| 6,805,940 B2 | 10/2004 | Koskenmaki et al. |
| 6,816,125 B2 | 11/2004 | Kuhns et al. |
| 2002/0018880 A1 | 2/2002 | Young |
| 2002/0070747 A1 | 6/2002 | Chiang et al. |
| 2002/0083858 A1 | 7/2002 | MacDiarmid et al. |
| 2003/0151028 A1 | 8/2003 | Lawrence et al. |
| 2004/0119593 A1 | 6/2004 | Kuhns |
| 2004/0174257 A1 | 9/2004 | Kuhns et al. |
| 2004/0175515 A1 | 9/2004 | Lawrence et al. |

FOREIGN PATENT DOCUMENTS

| | | |
|---|---|---|
| EP | 0 861 788 | 9/1998 |
| JP | 2001209770 | 8/2001 |
| WO | WO 97/13819 | 4/1997 |
| WO | WO 00/42678 | 7/2000 |
| WO | WO 02/096168 | 11/2002 |
| WO | WO 03/038748 | 5/2003 |

OTHER PUBLICATIONS

Information from Internet entitled, "Fluidic Self Assembly", http://www.alientechnology.com/products/fsa/, printed Apr. 1, 2005, 1 page.

Roberti, Mark, "Matrics Unveils PICA Assembly—The RFID systems provider gave RFID Journal a look at a new machine that it says can mass-assemble hundreds of millions of tags", RFID Journal, http://www.rfidjournal/.com/article/articleprint/1132/-1/1/, printed Apr. 4, 2005, 3 pages.

* cited by examiner

ENVIRONMENTALLY FRIENDLY RADIO FREQUENCY IDENTIFICATION (RFID) LABELS AND METHODS OF USING SUCH LABELS

TECHNICAL FIELD

The present invention relates to an environmentally friendly radio frequency identification (RFID) label. The present invention relates more particularly to an environmentally friendly radio frequency identification (RFID) label, comprising: a substrate including a first major surface and a second major surface opposite the first major surface; an RFID antenna attached to the first major surface of the substrate, where the RFID antenna is consisting essentially of tin, aluminum, palladium, gold, or combinations thereof; an integrated circuit attached to the antenna; and a first layer of repulpable adhesive attached to the substrate. The present invention also relates to methods using environmentally friendly radio frequency identification (RFID) labels.

BACKGROUND OF THE INVENTION

Radio-Frequency Identification (RFID) technology has become widely used in virtually every industry, including transportation, shipping, manufacturing, waste management, postal tracking, airline baggage reconciliation, and highway toll management. Recently, Wal*mart Stores, Inc. required that all shipments from its top one hundred suppliers are shipped with an RFID tag or label attached to each pallet or container, where the RFID tag or label carries information related to the shipment. RFID tags and labels are useful for tracking shipments from the supplier to the customer and even through the customer's supply chain.

A typical RFID system includes a plurality of RFID tags or labels, at least one RFID reader or detection system having an antenna for communication with the RFID tags or labels, and a computing device to control the RFID reader. An RFID tag typically does not include a layer of adhesive. An RFID label typically is an RFID tag having a layer of adhesive for attaching the RFID tag to an item. The RFID reader includes a transmitter that may provide energy or information to the tags or labels, and a receiver to receive identity and other information from the tags or labels. The computing device can read, and/or write, and processes the information obtained by the RFID reader.

In general, the information received from an RFID tag or label is specific to the particular application, but often provides an identification for an article to which the tag is affixed. Exemplary articles include manufactured items, shipping containers, books, files, animals, or virtually any other tangible article. Additional information may also be provided for the article. The tag or label may be used during a manufacturing process, for example, to indicate a paint color of an automobile chassis during manufacturing or other useful information.

The transmitter of the RFID reader outputs RF signals through the antenna to create an electromagnetic field that enables the tags or labels to return an RF signal carrying the information. The transmitter makes use of an amplifier to drive the antenna with a modulated output signal.

A conventional RFID tag or label may be an "active" tag or label that includes an internal power source, or a "passive" tag or label that is energized by the field created by the RFID reader antenna. Once energized, the tags and labels communicate using a pre-defined protocol, allowing the RFID reader to receive information from one or more tags or labels. The computing device serves as an information management system by receiving the information from the RFID reader and performing some action, such as updating a database. In addition, the computing device may serve as a mechanism for programming data into the tags or label via the transmitter.

A variety of methods of making RFID tags and circuits are known, including the following: U.S. Pat. No. 6,805,940; U.S. Pat. No. 6,816,125; U.S. Pat. No. 6,399,258; U.S. Publication No. 2003/0151028; U.S. Publication No. 2004/0175515; PCT Publication WO 03/038748; PCT Publication WO 00/42678; and U.S. Publication No. 2002/0018880.

SUMMARY OF THE INVENTION

One embodiment of the present invention provides an environmentally friendly radio frequency identification (RFID) label. The environmentally friendly radio frequency identification (RFID) label comprises: a substrate including a first major surface and a second major surface opposite the first major surface; an RFID antenna attached to the first major surface of the substrate, where the RFID antenna is consisting essentially of tin, aluminum, palladium, gold, or combinations thereof; an integrated circuit attached to the antenna; and a first layer of repulpable adhesive attached to the substrate. In one aspect of this embodiment, the RFID antenna is consisting of tin, aluminum, palladium, gold, or combinations thereof. In another aspect of this embodiment, the substrate is a paper substrate. In yet another aspect of this embodiment, the first layer of repulpable adhesive attaches the RFID label to the object. In another aspect of this embodiment, object comprises cellulose or wood-based materials.

Another embodiment of the present invention provides an alternative environmentally friendly radio frequency identification (RFID) label. The environmentally friendly radio frequency identification (RFID) label, comprises: a substrate including a first major surface and a second major surface opposite the first major surface; an RFID antenna attached to the first major surface of the substrate, where the RFID antenna contains no significant amounts of regulated metal; an integrated circuit attached to the antenna; and a first layer of repulpable adhesive attached to the substrate. In another aspect of this embodiment, the substrate is a paper substrate. In yet another aspect of this embodiment, the first layer of repulpable adhesive attaches the RFID label to the object. In another aspect of this embodiment, object comprises cellulose or wood-based materials.

Another embodiment of the present invention provides a method of recycling objects. The method comprises the steps of: providing an object having an environmentally friendly radio frequency identification (RFID) label attached to the object, where the environmentally friendly RFID label comprises: a substrate including a first major surface and a second major surface opposite the first major surface; an RFID antenna attached to the first major surface of the substrate, where the RFID antenna is consisting essentially of tin, aluminum, palladium, gold, or combinations thereof; an integrated circuit attached to the antenna; a first layer of repulpable adhesive attached to the substrate, where the first layer of repulpable adhesive attaches the RFID label to the object; and pulping the object and the RFID label.

Another embodiment of the present invention provides an alternative method of recycling objects. The method comprises the steps of: providing an object in combination with an environmentally friendly radio frequency identification (RFID) tag, where the object comprises cellulose or wood-based material, where the environmentally friendly RFID tag comprises: a substrate including a first major surface and a second major surface opposite the first major surface; an RFID antenna attached to the first major surface of the substrate, where the RFID antenna is consisting essentially of tin, aluminum, palladium, gold, or combinations thereof; an integrated circuit attached to the antenna; and pulping the object and the environmentally friendly RFID tag.

Certain terms are used in the description and the claims that, while for the most part are well known, may require some explanation. It should be understood that, when referring to "environmentally friendly," this means being nature-friendly or having minimal impact on the natural environment.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
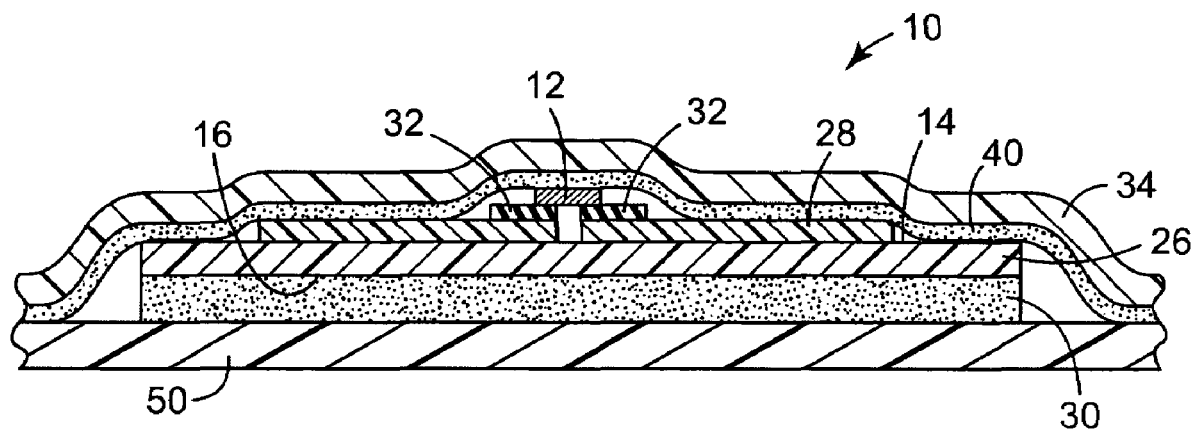
FIG. 1 is a cross sectional view of one embodiment of an RFID label of the present invention.

Radio frequency identification (RFID) tags or labels are increasingly being incorporated into labels for use on articles, such as cartons or other containers for shipping items. The RFID labels provide advantages such as more accurate data and labor savings in supply chain applications, increased security in pharmaceutical and other specialized shipments, and authentication and improved tracking of consumer goods. Many analysts project that within several years there will be at least several billion RFID labels produced and used annually.

Much attention has been given to providing RFID labels that meet application requirements, such as read range, proper communication with RFID reader devices, to providing methods to prevent physical damage to the fragile RFID integrated circuit in the RFID tag or label, or to otherwise address needs for durability, to duplicate machine-readable information such as bar codes, and so on, and to providing methods of making the RFID labels, including methods for making antennas, methods for placing the integrated circuit, and methods for making electrical connections between the integrated circuit and the antenna. However, very little attention has been given to disposing of articles having RFID labels attached to them in a safe and environmentally friendly manner, such as the millions of, containers or cartons that have RFID tags or labels attached to them, which are typically discarded after the items inside them have been removed.

Current methods of disposal of corrugated cardboard cartons typically used for shipping and packaging include: a) placing the used cartons in landfills; b) incinerating the used cartons; c) reusing the cartons; or d) recycling the cartons. Recycling is preferred and widely used for environmental reasons. In various municipalities and countries worldwide, it has been estimated that approximately 50 to 85 percent of all corrugated cardboard cartons are recycled. For typical recycling, the cartons are "pulped" or "repulped," that is, the cartons are placed in water and ground and beaten into pulp, which is typically made of about 5 percent wood fiber and 95 percent water. The pulp is then used to make various new products, including new containers. Most recycling operations prefer to use supplies of corrugated cardboard containers, paper, newsprint and so on that has been sorted, is free of contaminants, and is already baled to allow the supplies to be repulped without further processing required. The use of labor-intensive processes, such as removal of tape and labels, is typically not economically feasible to prepare the cardboard containers for repulping.

The present invention provides RFID tags and labels that are suitable for use on articles, such as corrugated cardboard containers and other containers or pallets, where it is not necessary to remove the RFID tag or label before the container is repulped or recycled. The RFID tags and labels are made from materials that are suitable to be repulped with the rest of the container, thus avoiding any additional labor to remove the RFID tags and labels before recycling or repulping the container.

FIG. 1 illustrates one embodiment of the RFID label 10 of the present invention. The RFID label 10 includes an integrated circuit 12, an RFID antenna 28, and a substrate 26 for the antenna 28. The antenna 28 and integrated circuit 12 are attached to one another, and electrically attached to each other. The antenna 28 is attached to the substrate. When the word "attached" is used herein, including the claims, it is meant that ultimately the two items are attached to each other in any manner, even though there may be intermediate structures between the two items that are stated to be attached. The antenna 28 is attached to the substrate.

The integrated circuit 12 provides the primary identification function. It may include software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID labels 10 include those available from Texas Instruments located in Dallas, Tex. (in their TIRIS or TAG-IT line of products), Philips Semiconductors located in Eindhoven, Netherlands (in their I-CODE, MIFARE and HITAG line of products), and ST Microelectronics located in Geneva, Switzerland, among others.

The antenna 28 geometry and properties depend on the desired operating frequency of the RFID label 10. For example, 915 MHz or 2.45 GHz RFID labels 10 would typically include a dipole antenna, such as a linear dipole antenna or a folded dipole antenna. A 13.56 MHz (or similar) RFID label 10 would typically use a spiral or coil antenna. However, other antenna designs are known to those skilled in the art. In either case, the antenna 28 intercepts the radio frequency energy radiated by an interrogation source. This signal energy carries both power and commands to the label 10. The antenna 28 enables the RF-responsive element to absorb energy sufficient to power the integrated circuit 12 and thereby provide the response to be detected. Thus, the characteristics of the antenna should be matched to the system in which it is incorporated. In the case of RFID labels operating in the high MHz to GHz range, the most important characteristic is the antenna length. Typically, the effective length of a dipole antenna is selected so that it is close to a half wavelength or multiple half wavelength of the interrogation signal. In the case of RFID labels operating in the low to mid MHz region (13.56 MHz, for example), where a half wavelength antenna is impractical due to size limitations, the important characteristics are antenna inductance and the number of turns on the antenna coil. For both antenna types, good electrical conductivity is required. It is also important that the input impedance of the selected integrated circuit match the impedance of the antenna for maximum energy transfer. Additional information about antennas is known to those of ordinary skill in the art from, for example, reference texts such as K. Finkenzeller, "RFID Handbook. Radio-Frequency Identification Fundamentals and Applications," (1999 John Wiley & Sons Ltd, Chichester, West Sussex, England).

The antenna 28 of the RFID label 10 is preferably made from materials that are considered environmentally friendly or made of materials that may be recycled along with the rest of the container during the repulping process described above. The repulping process involves the production of waste water and thus, the antenna materials should be materials which are safe for the waste water that may end up in rivers and lakes. For example, the antenna is preferably made of tin, aluminum, palladium or gold or combinations thereof.

There is no single, worldwide standard defining regulated metals, and even some national bodies, such as the United States Environmental Protection Agency, have failed to set limits such as wastewater limits for some metals which are known to be toxic or harmful at low levels or which are known to be pollutants. Thus, wastewater limits may be set by municipalities, states or provinces, countries or international bodies. In this application, we define "regulated metals" to be those metals which are typically limited in wastewater effluents to no more than 25 mg/L (which is equivalent to 25 parts per million). One useful guideline for determining regulated materials is provided by MARine POLution ("MARPOL") 73/78, which is a Convention of the International Maritime Organization of the United Nations and which seeks to control the discharge of harmful substances into the sea. The United States Coast Guard has developed a list to comply with MARPOL 73/78 which lists as moderate hazards the following metals (metals which must not exceed 1 ppm after flushing): barium, cobalt, gallium, germanium, hafnium, indium, iron, manganese, molydate (sic), osmium, platinum, rhenium, rhodium, ruthenium, tellurium, tungsten and vanadium. Metals that are more hazardous and may not be discharged into seawater in any concentration include antimony, aresenic, beryllium, cadmium, chromium, copper, lead, mercury, nickel, selenium, silver, thallium and zinc. It is worth noting that copper and silver, materials which are widely used in RFID antennas today, appear on the most hazardous list with well-known "toxic metals" such as mercury and lead. Similar conclusions about the undesirablility of copper and silver in wastewater may be reached by examining a wide number of state and municipal websites in the United States, and it should be noted that regulations in Europe are often more protective of the environment than those in the United States.

Therefore, the RFID antenna 28 should contain no significant amounts of a regulated metal, and preferably should be made of tin, aluminum, gold, palladium, or combinations thereof. Although gold and palladium are quite expensive, and not commonly used for RFID antennas, they too are unregulated metals, and therefore the antenna 28 may be made of gold or palladium or in some combination with the materials listed above. Tin or aluminum or combinations thereof are preferred materials for the RFID antenna 28.

Aluminum RFID antennas are commercially available today from a variety of sources, such as Lucatron located in Singapore and Toyo Aluminum located in Osaka, Japan. Methods for making tin or aluminum antennas, for example, using conductive flexographic and gravure inks, is disclosed in U.S. Pat. Publication No. 2003/0151028 A1, a rotary screen printing method, is disclosed in PCT Publication WO 03/038748 A1, a method using metal powder, is disclosed in U.S. Pat. No. 6,805,940 B2, or a method of stamping foils, is disclosed in U.S. Pat. Publication No 2002/0018880 A1, all of which are hereby incorporated by reference. Other methods of producing an antenna pattern include etching, plating and other variations as are known to those skilled in the art.

The substrate 26 includes a first major surface 14 and a second major surface 16 opposite the first major surface 14. The antenna 28 is attached to the first major surface 14, as illustrated in FIG. 1. However, the antenna 28 may be attached to the second major surface 16, along with integrated circuit 12. Preferably the substrate 26 is a flexible substrate, so that it could be used in a label that may be wrapped around an object. The flexible substrate 26 should have enough flexibility to conform to a variety of surfaces and bend easily around corners. For example, the substrate 26 is preferably in the range of 25-200 microns in thickness, and is made of a flexible material, such as paper or polymeric films. Polymeric films may be made from polymers, such as polyimides, or polyesters, such as polyethyleneterephthalate or polyethylenenaphthanate or copolyers thereof. Specific methods for making a tin antenna as described above may disclose other suitable substrates. Paper substrates are preferred, as they are easily handled in a repulping process. However, polymeric film substrates are also acceptable, as most repulping operations have methods to remove or handle small pieces of polymeric film, such as those that may be introduced from labels or tapes. If the substrate 26 is flexible, this helps facilitate the manufacturing of the RFID label and provides ease in handling as the RFID label is applied to objects, such as shipping containers. Typically, if the substrate 26 is flexible, as described above, then the antenna 28 is flexible as well.

The RFID label 10 may include optional conductive material 32 for electrically connecting the integrated circuit 12 to the RFID antenna 28. The combination of the integrated circuit 12, antenna 28, and antenna substrate 26 is commonly referred to in the art as an RFID tag.

There are several conductive materials 32 that are well-known for making electrical connections between integrated circuit 12 and antenna 28, including solders, solder pastes, adhesive conductive films (polymeric films filled with metal particles), which may be either isotropic or anisotropic, and the like. The integrated circuit 12 may include circuit attach pads, also known as bumps, for connecting wires or the antenna to the integrated circuit. Depending on the materials chosen for the integrated circuit attach pads and antenna 28, it may also be possible to make a direct connection between integrated circuit 12 and antenna 28 without the use of conductive material 32. Materials and methods for making electrical connection between integrated circuits and metallic traces, such as antennas, are well known to those skilled in the art. Preferably, conductive material 32 is substantially free of regulated materials, as described above. For example, preferably the conductive material 32 does not contain solders having lead.

The RFID label may include a first layer of adhesive 30 attached to the second major surface 14 of the substrate 26 to create an RFID label 10. The layer of adhesive 30 is useful for attaching the RFID label 10 to objects 50. The RFID label 10 may also optionally include a liner (not shown) on the layer of adhesive 30. Suitable liner materials include polyethylene and silicon coated papers. The release liner will not necessarily be recycled in the same manner and process as the RFID label 10, as it will not be attached to objects such as a corrugated, cardboard container.

The first layer of adhesive 30 is preferably a repulpable adhesive. Repulpable or water-dispersible adhesives are well known in the art, and for example, preferred adhesives are described in U.S. Pat. No. 5,380,779, "Pressure Sensitive Adhesive Composition Which Is Repulpable Under Acidic PH Conditions," which is hereby incorporated by reference. Other examples of repulpable adhesives are disclosed in: U.S. Pat. No. 4,431,080; U.S. Pat. No. 4,569,960; U.S. Pat. No. 4,482,675; U.S. Pat. No. 4,388,432; U.S. Pat. No. 5,102,733; and U.S. Pat. No. 5,125,995. An adhesive is considered a repulpable adhesive if it passes one of the repulpability tests disclosed in U.S. Pat. No. 5,380,779, which discloses the water-dispersibility repulpability test and the European repulpability test. The adhesive 30 is preferably a pressure-sensitive adhesive. However, the adhesive may also be caused to adhere to objects by the application of heat, water or solvents, for example, a water-activated paste.

The RFID label 10 may optionally include a cover layer 34. The cover layer 34 may be directly attached to the substrate 26, for example, by lamination. Alternatively, the cover layer 34 may be attached to the substrate 26 by a second layer of adhesive 40, as illustrated in FIG. 1. The adhesive 40 can be the same as or different than the layer of adhesive 30, but preferably it is also a repulpable adhesive, as described above. The cover layer 34 and layer of adhesive 40 are useful for attaching the RFID label 10 to an article 50. The cover layer 34 may extend beyond the substrate 26, for example, it might be a tape that is used to affix the RFID label 10 to an object 50. Suitable materials for the cover layer 34 include polyester films or papers. Alternatively, the cover layer 34 and layer of adhesive 40 may be any commercially available tape sold by 3M Company, based in St. Paul, Minn. The cover layer 34 may be printed or patterned with information, for example, a company logo, an advertisement, or information about the object 50 to which the label 10 is attached. The printed information may specifically include a bar code or other symbolic representation to allow a visual or optical confirmation of the information pertaining to the RFID label 10. Alternatively, the cover layer may be stapled or otherwise attached to any item. The cover layer may be wrapped around a handle of a container, for example, and then attached to itself to attach the RFID label to the container.

Preferably, the object 50 is made of wood-based and/or cellulose-based materials. Examples of suitable wood-based materials are cardboard, paperboard, boxboard paper and the like, and this material may be provided in any structure, such as solid and flat or of other constructions, such as a corrugated construction. Wood-based material may also be wood that has not yet been pulped and made into derivative products. For example, object 50 may be a wooden crate or pallet. Wood-based material may also be wood that has been previously processed into chips and then made into products, such as chipboard. The wood-based material may be part of a container, such as a box, carton, tub, tote or the like, or it may be part of a document, newspaper, magazine, book, file folder or many other items that are made from wood fiber. The material may further include ink for either decorative, informational, promotional, labeling or identification purposes, tape (preferably repulpable tape), fasteners and the like. For example, the wood-based material may be a corrugated shipping carton, a shoebox, a corrugated box covered with printed paper for consumer electronics, a file folder, a document, a telephone directory book, a newspaper or any of a large number of other wood based objects, especially those which are commonly recycled.

Alternatively, the object 50 may be made of cellulose-based materials. Cellulose-based materials are typically made of inert carbohydrates, ($C_6H_{10}O_5$) and typically are the main constituent of the cell walls of plants and materials, such as wood, cotton, hemp, paper, flax, kenaf, cotton, linen, bamboo, etc.

The RFID label 10 illustrated in FIG. 1 may further include additional layers, such as materials to protect the integrated circuit from physical damage, antistatic coatings, materials to provide electromagnetic shielding, decorative elements, and so on, and preferably such materials do not contain regulated metals or other materials which are regulated in wastewater because they are hazardous, harmful or pollutants.

Figure 2:
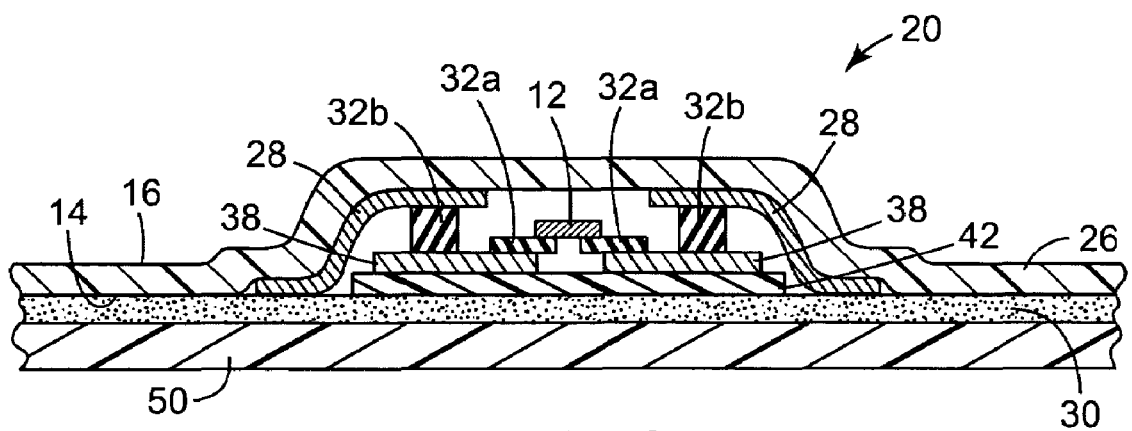
FIG. 2 is a cross sectional view of another embodiment of an RFID label of the present invention.

An alternative RFID label 20 of the present invention is illustrated in FIG. 2. The integrated circuit 12, antenna 28, substrate 26, conductive material 32, and first layer of adhesive 30 are the same as those items described above in reference to FIG. 1. However, in FIG. 2 the integrated circuit 12 is electrically connected via optional conductive material 32a to a strap metal trace 38 on a strap substrate 42. Strap metal trace 38 is also electrically connected via conductive material 32b to RFID antenna 28. Conductive material 32a and 32b may be the same or different types of conductive material, as described above. Strap metal trace 38 is a patterned metal that is designed to align with attach pads on integrated circuit 12 for the purpose of making an electrical connection to the integrated circuit 12 and to provide larger areas of metal, extending well beyond integrated circuit 12, that may be used to make electrical connection to antenna 28. Strap metal 38 may be made of the same material as the *antenna 28 or of a different material, but it should contain no significant amounts of regulated metal, as described above, or be made of tin, aluminum, palladium, gold, or combinations thereof. The strap substrate 42 may be made of the same materials as the substrate 26.

The strap metal trace 38 may be fabricated on strap substrate 42 by any known method in the art, such as those methods used to make the antenna 28 described above. The combination of the integrated circuit 12, optional adhesive 30, strap metal trace 38, and strap substrate 42 is often referred to as a strap, an interposer, or a leadframe in the art. One advantage of a strap is that it provides an electrical connection to integrated circuit 12 in an easy-to-handle package that can subsequently be electrically connected to antenna 28 with commonly available or inexpensive equipment via fast, simple processes with large tolerances. Straps may be assembled with the use of automated machines for handling integrated circuits (for example, so called pick-and-place machines) or with techniques such as fluidic self assembly or other parallel processes, as described, for example, in U.S Pat. No. 5,545,291.

The RFID antenna 28 is located on a first surface 14 of substrate 26. Alternatively, it may also be possible to make an electrical connection between strap metal trace 38 and antenna 28 without the use of any adhesive, by means such as welding, making physical connections such as staking, by the use of mechanical fasteners such as staples, and other means. A layer of adhesive 30 is in contact with the first surface 14 of substrate 26 where is it exposed, and covers the other components, that is, the antenna 28, and strap 38, where they are placed on the first surface 14 of substrate 26. The second surface 16 of the substrate 26 may be printed or patterned with information, as described above. Therefore, the materials for the substrate 26 may be chosen for their receptivity to printing or chosen for appearance.

Other variations in RFID label or RFID tag constructions construction will be apparent to those skilled in the art and are within the scope of this invention. For example, the antenna of an RFID label could be produced directly on the object, such as a cardboard box, without the use of adhesives, such as with the methods disclosed in U.S. Pat. Publication No. 2004/0175515, "Printing Conductive Flexographic and Gravure Inks," (Lawrence et al.). As another example, electronic article surveillance ("EAS") tags and labels may include materials as described herein to produce environmentally friendly EAS tags on labels. EAS tags or labels typically include a Radio-frequency antenna, but not an integrated circuit.

For many applications, it is also necessary to have a reliable, simple and rapid manufacturing process that can produce large quantities of RFID tags in a cost-effective manner. One of the most rapid and cost-effective methods to handle labels, tags, partially assembled tags and components (for example, substrates containing an antenna) is in the form of continuous rolls. A continuous roll of RFID tags 10 may have a range of widths from about the width of a single label to a width of multiple tags, as much as 150 cm. The length of a roll may have a range of lengths from about the length of 20 tags up to as many as about 10,000 tags, or up to 75 m long. Such rolls may be handled in continuous processes, for example, they are unwound, processed, and rewound. These processes may be performed on a roll that is constantly moving at a steady speed, or they may be performed on small sections of roll which are not moving for short periods of time, a so-called step-and-repeat process. Processes that can be performed on rolls moving at a constant speed are preferred, because they are faster than step-and-repeat processes and because step-and-repeat equipment is more complicated and expensive. However, both constantly moving rolls and step-and-repeat rolls are preferred to handling of sheets of tags or individual tags, which is slower and much less cost-effective. The RFID labels 10 of the present invention may be advantageously manufactured using the methods describe above to produce a large number of labels 10 with relatively inexpensive costs.

The present invention also provides methods of recycling objects having environmentally safe RFID labels 10, 20. One embodiment of the method includes providing an object having an environmentally safe RFID label 10, 20 and then pulping the object and the RFID label 10, 20 This method may be applied to objects such as wood pallets, corrugated containers, especially used corrugated containers (often called- "old corrugated containers" or OCC's), boxes, documents and individual pieces of paper, newspapers and the like. Many wood based objects, particularly OCC's, are recycled in a process where the OCC's are collected, and then pulped or repulped by placing the OCCs in water and using a combination of mechanical and/or chemical means to convert the OCC to pulp. The term "repulp" is often used because the OCC was initially produced from a wood-based pulp. The pulp is then placed on a screen or similar device to separate the pulp fibers from the water and produce paper, cardboard or similar products. Many other steps may be included, as is well known to those in the art in the paper and recycling industries. It is not desirable, practical or economically feasible to remove an RFID antenna from an object prior to pulping; while other steps (such as use, collection and baling of the wood-based object having an RFID antenna containing no significant amounts of regulated metal, may be employed, the method is intended to eliminate the need to remove the antenna, whether at a recycling facility or earlier, prior to pulping.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An environmentally friendly radio frequency identification (RFID) label, comprising:
   a substrate including a first major surface and a second major surface opposite the first major surface;
   an RFID antenna attached to the first major surface of the substrate, wherein the RFID antenna is consisting essentially of tin, aluminum, palladium, gold, or combinations thereof;
   an integrated circuit attached to the antenna; and
   a first layer of repulpable adhesive attached to the substrate.

2. The environmentally friendly RFID label of claim 1, wherein the RFID antenna is consisting of tin, aluminum, palladium, gold, or combinations thereof.

3. The environmentally friendly RFID label of claim 1, wherein the substrate is a paper substrate.

4. The environmentally friendly RFID label of claim 1 further comprising a cover layer attached to the substrate.

5. The environmentally friendly RFID label of claim 4 further comprising a second layer of adhesive between the cover layer and the substrate, wherein the second layer of adhesive is a repulpable adhesive.

6. The environmentally friendly RFID label of claim 1 further comprising a liner attached to the first layer of adhesive opposite the substrate.

7. An object in combination with the environmentally friendly RFID label of claim 1, wherein the first layer of repulpable adhesive attaches the RFID label to the object.

8. The object in combination with the environmentally friendly RFID label of claim 7, wherein the object comprises cellulose or wood-based materials.

9. A continuous roll of environmentally friendly RFID labels, wherein a plurality of RFID labels of claim 1 are attached to one another.

10. An environmentally friendly radio frequency identification (RFID) label, comprising:
    a substrate including a first major surface and a second major surface opposite the first major surface;
    an RFID antenna attached to the first major surface of the substrate, wherein the RFID antenna contains no significant amounts of regulated metal;
    an integrated circuit attached to the antenna; and
    a first layer of repulpable adhesive attached to the substrate.

11. The environmentally friendly RFID label of claim 10, wherein the substrate is a paper substrate.

12. The environmentally friendly RFID label of claim 10 further comprising a cover layer attached to the substrate.

13. The environmentally friendly RFID label of claim 12 further comprising a second layer of adhesive between the cover layer and the substrate, wherein the second layer of adhesive is a repulpable adhesive.

14. The environmentally friendly RFID label of claim 10 further comprising a liner attached to the first layer of adhesive opposite the substrate.

15. An object in combination with the environmentally friendly RFID label of claim 10, wherein the first layer of repulpable adhesive attaches the RFID label to the object.

16. The object in combination with the environmentally friendly RFID label of claim 15, wherein the object comprises cellulose or wood-based material.

17. A continuous roll of environmentally friendly RFID labels, wherein a plurality of RFID labels of claim 10 are attached to one another.

18. A method of recycling objects, comprising the steps of:
  providing an object having an environmentally friendly radio frequency identification (RFID) label attached to the object, wherein the environmentally friendly RFID label comprises:
    a substrate including a first major surface and a second major surface opposite the first major surface;
    an RFID antenna attached to the first major surface of the substrate, wherein
    the RFID antenna is consisting essentially of tin, aluminum, palladium, gold, or combinations thereof;
    an integrated circuit attached to the antenna;
    a first layer of repulpable adhesive attached to the substrate, wherein the first layer of repulpable adhesive attaches the RFID label to the object; and
    pulping the object and the RFID label.

19. The method of claim 18, wherein the object comprises cellulose or wood-based materials.

20. The method of claim 18, wherein the RFID antenna is consisting of tin, aluminum, palladium, or combinations thereof.

21. A method of recycling objects, comprising the steps of:
  providing an object in combination with an environmentally friendly radio frequency identification (RFID) tag, wherein the object comprises cellulose or wood-based material, wherein the environmentally friendly RFID tag comprises:
    a substrate including a first major surface and a second major surface opposite the first major surface;
    an RFID antenna attached to the first major surface of the substrate, wherein
    the RFID antenna is consisting essentially of tin, aluminum, palladium, gold, or combinations thereof;
    an integrated circuit attached to the antenna; and
    pulping the object and the environmentally friendly RFID tag.

22. The method of claim 21, wherein the RFID antenna is consisting of tin, aluminum, palladium, gold, or combinations thereof.

23. The method of claim 21, wherein the RFID label further comprises a first layer of repulpable adhesive attached to the substrate, and wherein the first layer of repulpable adhesive attaches the RFID label to the object.

\* \* \* \* \*

UNITED STATES PATENT AND TRADEMARK OFFICE
CERTIFICATE OF CORRECTION

PATENT NO. : 7,417,550 B2 Page 1 of 1
APPLICATION NO. : 11/017131
DATED : August 26, 2008
INVENTOR(S) : Katherine A. Brown It is certified that error appears in the above-identified patent and that said Letters Patent is hereby corrected as shown below:

Title Page 2 line 7
Item [56], References Cited, OTHER PUBLICATIONS, Delete "rfidjournal/.com" and insert -- rfidjournal.com --, therefor.

Column 8
Line 27, Delete "*antenna" and insert -- antenna --, therefor.

Signed and Sealed this

Twenty-second Day of December, 2009

David J. Kappos
*Director of the United States Patent and Trademark Office*